United States Patent
Yamada et al.

(10) Patent No.: US 6,191,874 B1
(45) Date of Patent: *Feb. 20, 2001

(54) IMAGE PROCESSING APPARATUS AND METHOD, AND A RECORDING MEDIUM

(75) Inventors: Akitoshi Yamada; Hiromitsu Hirabayashi, both of Irvine, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/873,714

(22) Filed: Jun. 12, 1997

(30) Foreign Application Priority Data

Jun. 18, 1996 (JP) .................................. 8-156984

(51) Int. Cl.$^7$ ................. G03F 3/08; H04N 1/46
(52) U.S. Cl. ............... 358/529; 358/530; 358/518; 382/162; 382/167
(58) Field of Search ................... 358/500, 529, 358/530, 504, 515, 517, 518, 523, 524, 537; 382/162, 167, 169

(56) References Cited

U.S. PATENT DOCUMENTS

| | | | |
|---|---|---|---|
| 4,887,150 | * 12/1989 | Chiba | 358/500 |
| 5,161,132 | 11/1992 | Hiramatau | 369/13 |
| 5,539,435 | 7/1996 | Uchida et al. | 347/33 |
| 5,612,793 | * 3/1997 | Ito et al. | 358/500 |

* cited by examiner

Primary Examiner—Jerome Grant, II
(74) Attorney, Agent, or Firm—Fitzpatrick, Cella, Harper & Scinto

(57) ABSTRACT

An image processing system for printing, in which a decrease in saturation in the entire image is prevented while maintaining reproducibility for an achromatic color (gray balance). The image processing system extracts an achromatic-color component from an image signal including C, M and Y signals, and performs color correction for the C, M and Y signals by subtracting the achromatic-color component from the C, M and Y signals. The system then generates a K signal based on the achromatic-color component, and adds the achromatic-color component to the C, M and Y signals subjected to the color correction.

13 Claims, 10 Drawing Sheets

FIG.10A

| DIRECTORY INFORMATION |
| --- |
| : |
| INPUT MODULE |
| LUMINANCE-TO-DENSITY CONVERSION MODULE |
| ACHROMATIC-COLOR-COMPONENT EXTRACTION MODULE |
| : |
| COLOR CORRECTION MODULE |
| DENSITY CORRECTION MODULE |
| : |
| BLACK-GENERATION MODULE |
| OUTPUT CORRECTION MODULE |
| : |
| |
| |

FIG.10B

| DIRECTORY INFORMATION |
| --- |
| : |
| INPUT MODULE |
| LUMINANCE-TO-DENSITY CONVERSION MODULE |
| CHROMATIC-COLOR-COMPONENT/ ACHROMATIC-COLOR-COMPONENT EXTRACTION MODULE |
| : |
| COLOR CORRECTION MODULE |
| COLOR ADJUSTMENT MODULE |
| : |
| INK-SIGNAL GENERATION MODULE |
| COLOR CORRECTION MODULE |
| : |
| |
| |

IMAGE PROCESSING APPARATUS AND METHOD, AND A RECORDING MEDIUM

BACKGROUND OF THE INVENTION

1. Field of the Invention

This invention relates to an image processing apparatus and method, and more particularly, to an image processing apparatus and method for performing color processing, and to a recording medium.

2. Description of the Related Art

FIG. 1 is a flowchart illustrating processing when printing on a color printer a color image which is displayed on a CRT (cathode-ray tube). In FIG. 1, processing for converting R, G and B image data for CRT display into C, M, Y and K image data corresponding to inks of four colors (cyan (C), magenta (M), yellow (Y) and black (K)) for printing on a color printer.

By performing luminance-to-density conversion in step S102 for R, G and B image data (Rin, Gin and Bin) input in step S101, C, M and Y image data (Cin, Min and Yin) are obtained. Inks of three primary colors, cyan, magenta and yellow, do not have ideal colors, and also have other color components (unnecessary components). In order to compensate for the influence by these unnecessary components, color correction is performed for the C, M and Y image data in step S103. For example, a masking method is known as a method for such color correction.

C, M and Y image data (C1, M1 and Y1) subjected to color correction are converted, in step S104, into C, M, Y and K image data (C2, M2, Y2 and K2) according to black-generation processing. In general, the minimum value of the C, M and Y image data is made to be an achromatic-color component and is used as black-image data K (black generation). By subtracting the value of K from the respective original C, M and Y image data (removal of under color), C, M, Y and K image data (C2, M2, Y2 and K) are obtained. Then, in step S105, density correction desired by the user is performed. Then, in step S106, output correction is performed, and obtained output data (Cout, Mout, Yout and Kout) are transmitted to a color printer.

FIG. 2 is a flowchart also illustrating processing when printing on a color printer a color image which is displayed on a CRT. In the flowchart of FIG. 2, however, black-generation processing (step S104) is performed before performing color correction (step S103).

The above-described techniques, however, have the following problems.

In the processing shown in FIG. 1, the minimum value of C, M and Y image data after performing luminance-to-density conversion is made to be a black component. When, for example, the C component from among the C, M and Y image data has a minimum value, if the C component is included in unnecessary components of inks corresponding to the remaining M and Y components, achromatic-color components are produced due to the unnecessary components, thereby degrading saturation in the entire image.

In order to prevent degradation in saturation by removing influence by the unnecessary components of inks in the processing shown in FIG. 1, it is necessary to perform conversion in which the unnecessary components are taken into consideration in the luminance-to-density conversion in step S102. For that purpose, it is necessary to form a large number of color patches, to measure the densities of the respective color patches, and to calculate a conversion table or the like from the results of the measurement. This requires a significant number of operations. Furthermore, when performing luminance-to-density conversion in which unnecessary components in inks are taken into consideration, it is difficult to make achromatic colors represented by C=M=Y to be achromatic colors after the correction. That is, it is very difficult to prevent degradation in saturation in the entire image while maintaining reproducibility for achromatic colors (gray balance).

When performing color correction after performing black-generation processing shown in FIG. 2, also, influence of unnecessary components in inks is not removed, thereby degrading saturation in the entire image.

SUMMARY OF THE INVENTION

It is an object of the present invention to solve the above-described problems.

It is another object of the present invention to prevent degradation in saturation in the entire image while maintaining gray balance, and to obtain a high-picture-quality image.

It is still another object of the present invention to provide an image processing apparatus and method which can maintain gray balance according to density correction based on a user's manual instruction.

According to one aspect, the present invention which achieves these objectives relates to an image processing apparatus which includes input means for inputting an image signal including a plurality of color-component signals, extraction means for extracting an achromatic-color component from the input image signal and for subtracting the achromatic-color component from the plurality of color-component signals, color correction means for performing color correction for the plurality of color-component signals output from the extraction means and for outputting a plurality of color-component signals subjected to color correction indicated by real numbers, and generation means for generating an achromatic-color-component signal based on the achromatic-color component extracted by the extraction means and for adding the achromatic-color component to the plurality of color-component signals subjected to the color correction by the color correction means.

According to another aspect, the present invention which achieves these objectives relates to an image processing method which includes an input step of inputting an image signal including a plurality of color-component signals, an extraction step of extracting an achromatic-color component from the input image signal and for subtracting the achromatic-color component from the plurality of color-component signals, a color correction step of performing color correction for the plurality of color-component signals obtained in the extraction step and outputting a plurality of color-component signals subjected to color correction indicated by real numbers, and a generation step of generating an achromatic-color-component signal based on the achromatic-color component extracted in the extraction step and adding the achromatic-color component to the plurality of color-component signals subjected to the color correction in the color correction step.

According to still another aspect, the present invention which achieves these objectives relates to a memory which can be read by a computer and which stores program codes for image processing. The memory includes a code of an input step of inputting an image signal including a plurality of color-component signals, a code of an extraction step of extracting an achromatic-color component from the input image signal and for subtracting the achromatic-color component from the plurality of color-component signals, a code of a color correction step of performing color correction for the plurality of color-component signals obtained in the extraction step and outputting a plurality of color-component signals subjected to color correction indicated by real numbers, and a code of a generation step of generating an achromatic-color-component signal based on the achromatic-color component extracted in the extraction step and adding the achromatic-color component to the plurality of color-component signals subjected to the color correction in the color correction step.

According to still another aspect, the present invention which achieves these objectives relates to an image processing apparatus which includes extraction means for extracting an achromatic-color component and chromatic-color components in an input color image signal, and generation means for performing color correction for the chromatic-color components, for adding the achromatic-color component to the chromatic-color components subjected to the color correction indicated by real numbers, and for generating an ink signal.

According to still another aspect, the present invention which achieves these objectives relates to an image processing method which includes an extraction step of extracting an achromatic-color component and chromatic-color components in an input color image signal, a color correction step of performing color correction for the chromatic-color components, and a generation step of adding the achromatic-color component to the chromatic-color components subjected to the color correction indicated by real numbers and generating an ink signal.

According to still another aspect, the present invention which achieves these objectives relates to a memory which can be read by a computer and which stores program codes for image processing. The memory includes a code of an extraction step of extracting an achromatic-color component and chromatic-color components in an input color image signal, a code of a color correction step of performing color correction for the chromatic-color components, and a code of a generation step of adding the achromatic-color component to the chromatic-color components subjected to the color correction indicated by real numbers and generating an ink signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A and 10B are diagrams each illustrating a memory map of a storage medium storing program codes according to the present invention.

DESCRIPTION OF THE PREFERRED EMBODIMENTS

An image processing apparatus according to the present invention will now be described in detail with reference to the drawings.

Figure 9:
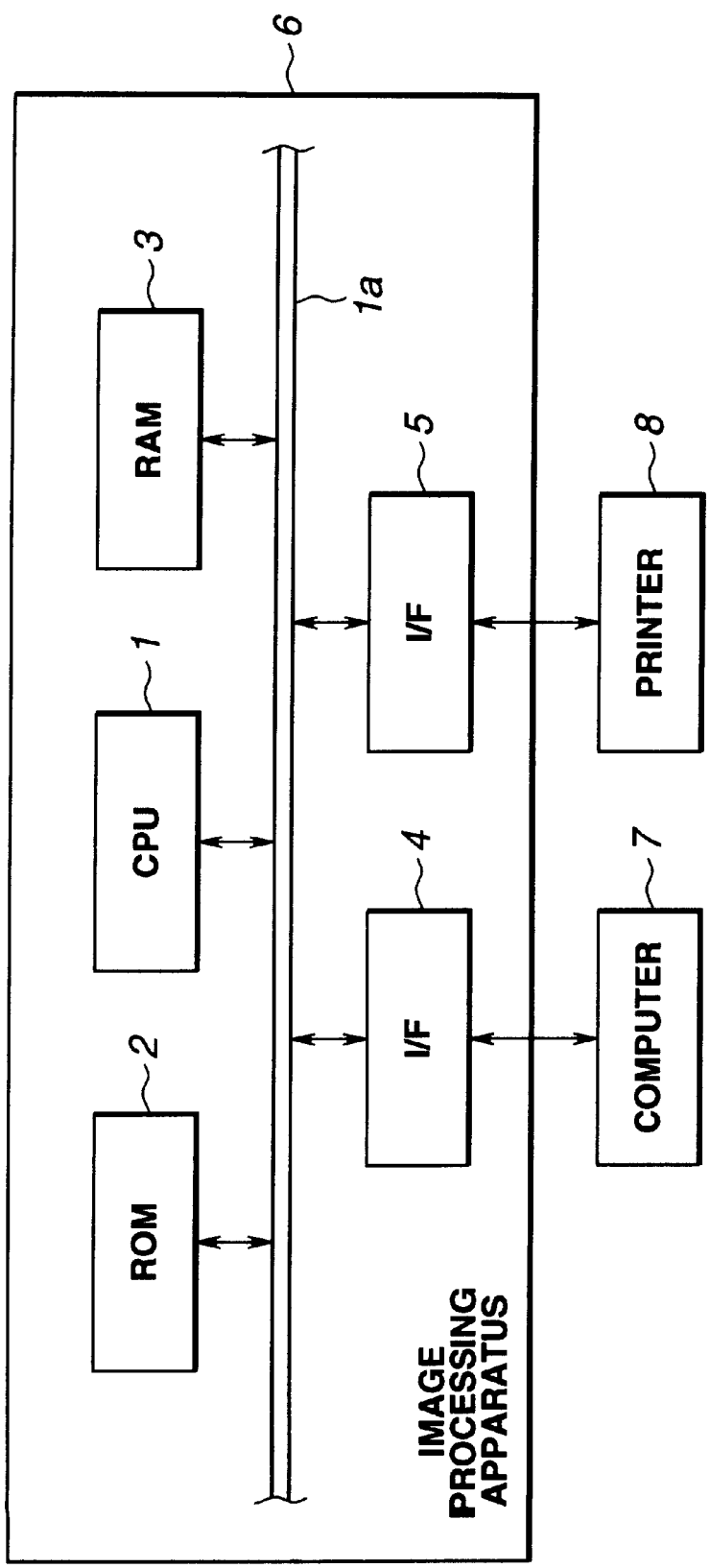
FIG. 9 is a block diagram illustrating an example of a configuration of an image processing apparatus according to the present invention.

FIG. 9 is a block diagram illustrating an example of a configuration of an image processing apparatus 6 according to the present invention. In FIG. 9, a CPU (central processing unit) 1 controls other components via a CPU bus 1$a$ based on programs stored in a ROM (read-only memory) 2, and executes various kinds of processing, including image processing which will be described later, using a RAM (random access memory) 3.

In each of the following embodiments of the present invention, a description will be provided of image processing in which image data input from an image-data forming/editing apparatus, such as a computer 7 or the like, is processed, the processed data is output to a printer 8, such as a color ink-jet printer or the like, and a visual image based on the image data is formed on a recording sheet. In the following description, a case of realizing image processing according to the invention using software is illustrated. However, it is, of course, possible to realize the image processing according to hardware processing using, for example, a look-up table.

First Embodiment

Figure 1:
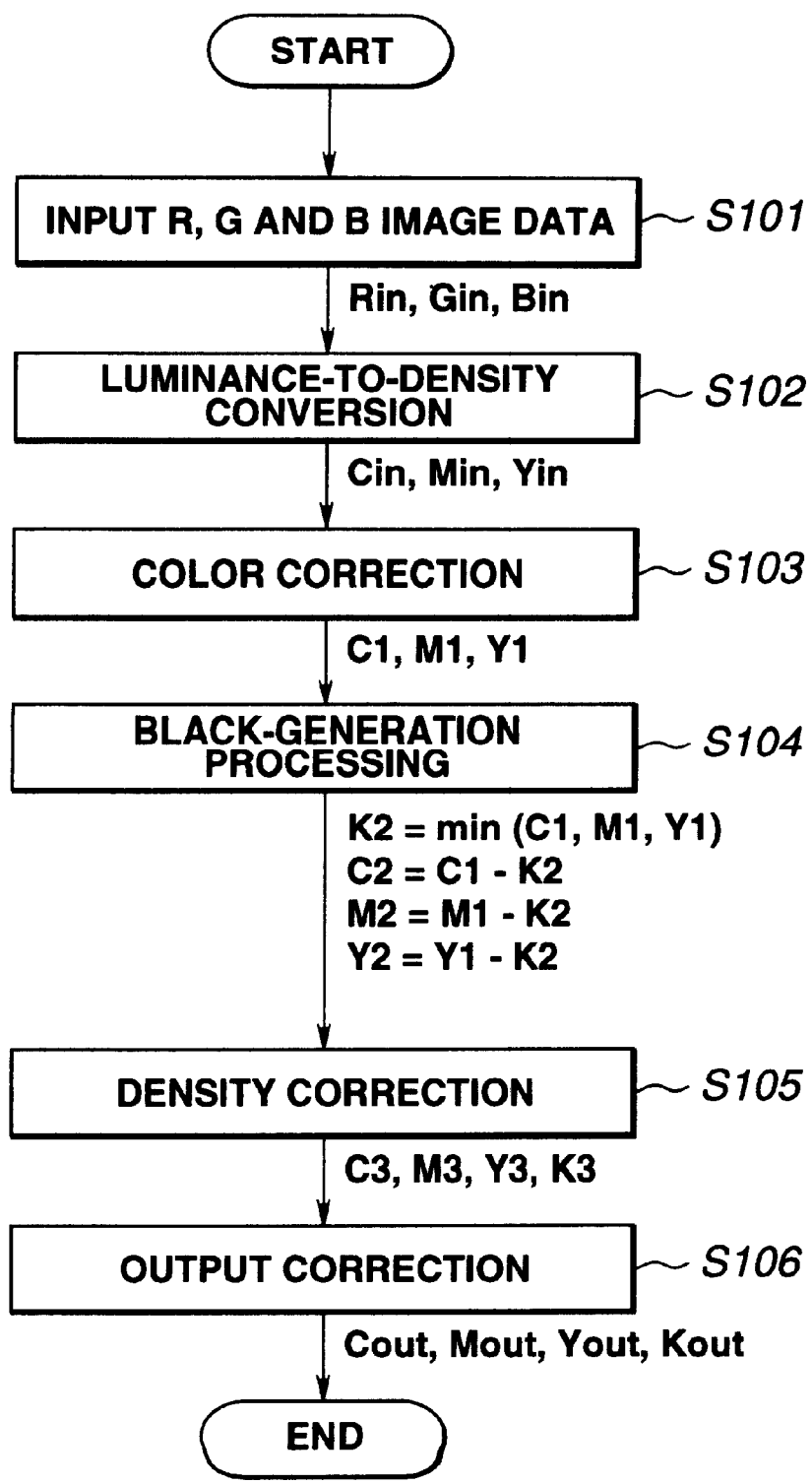
FIG. 1 is a flowchart illustrating processing when printing a color image displayed on a CRT.
Figure 2:
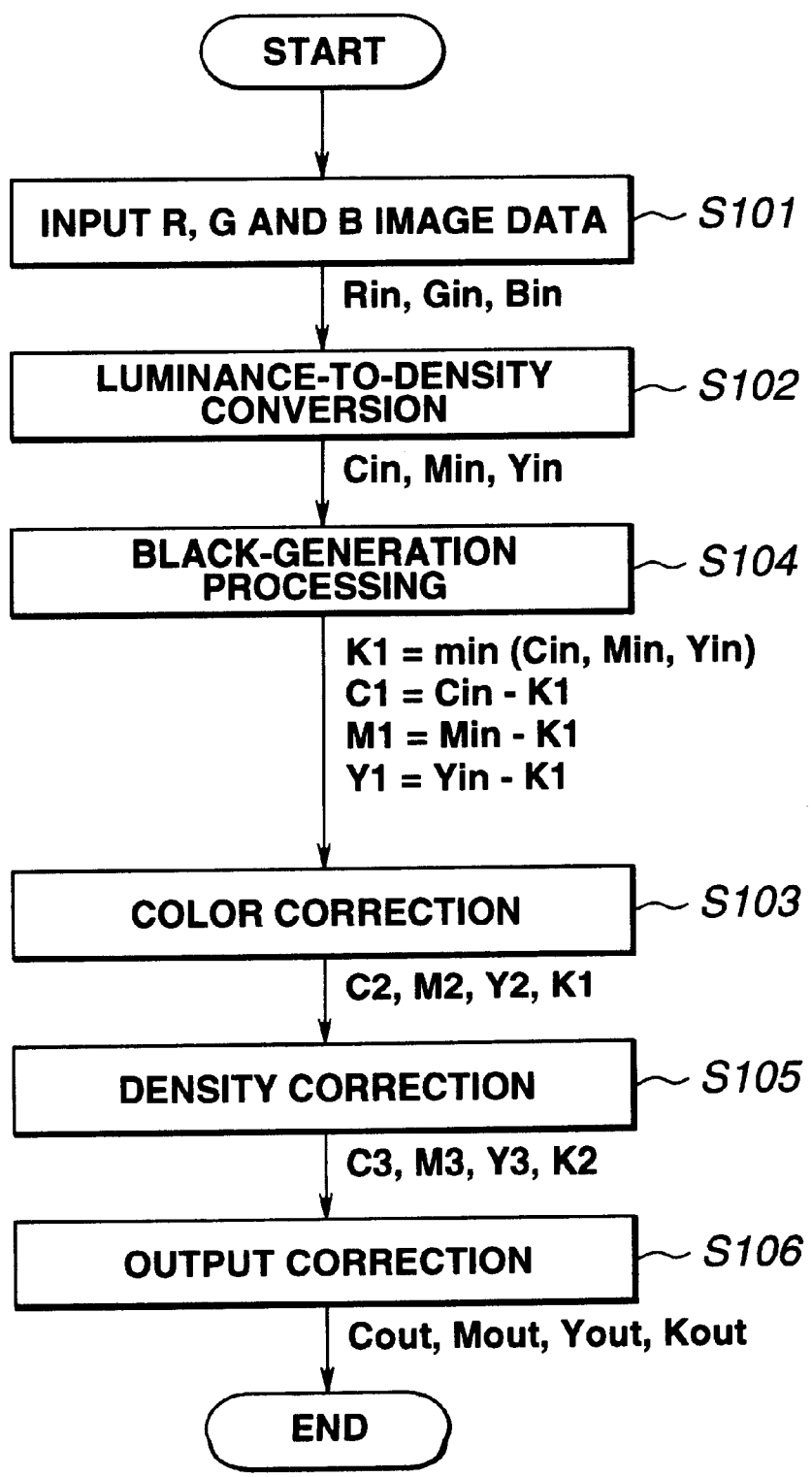
FIG. 2 is a flowchart illustrating another processing when printing a color image displayed on a CRT.
Figure 3:
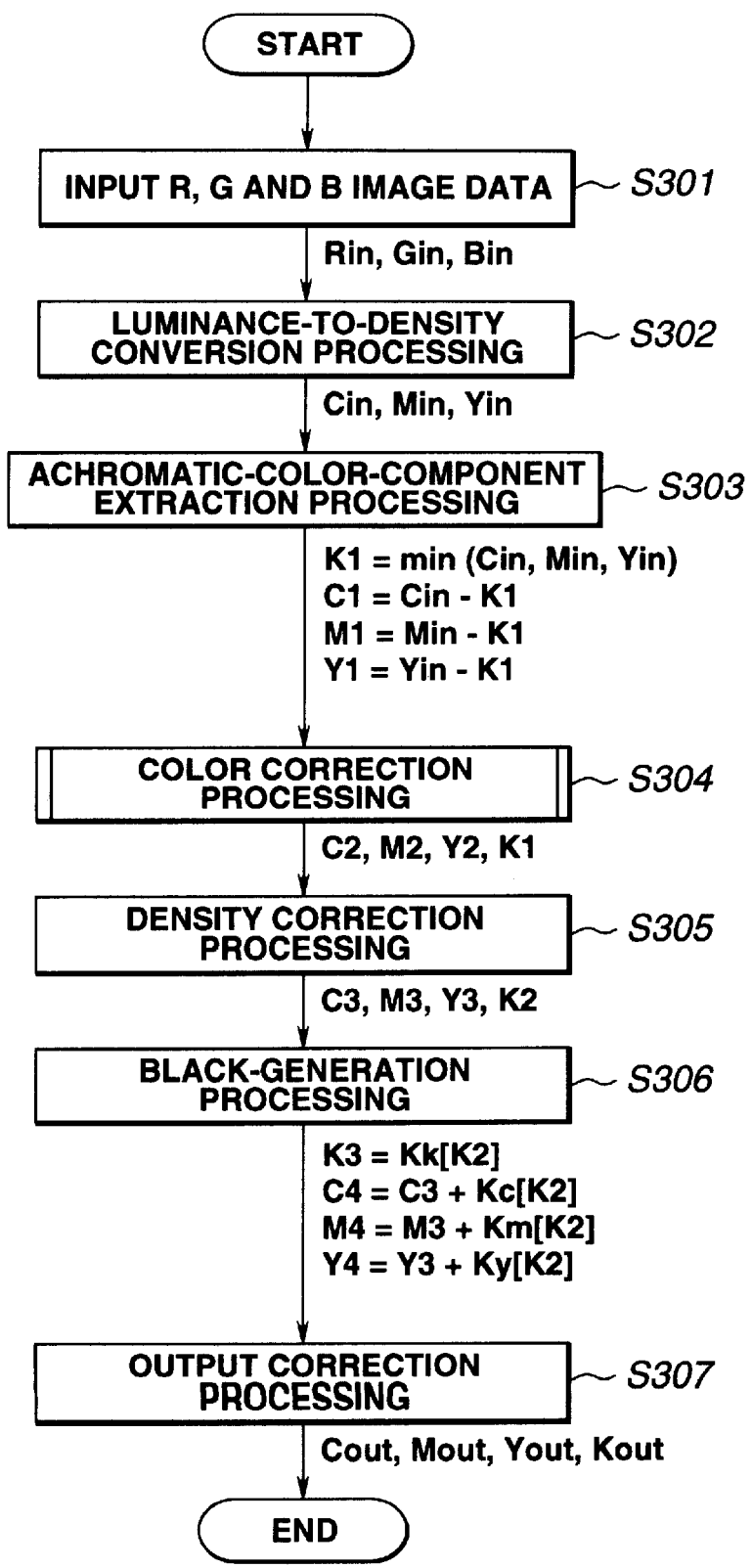
FIG. 3 is a flowchart illustrating an example of processing of converting image data for display into image data for printing according to a first embodiment of the present invention.

FIG. 3 is a flowchart illustrating an example of processing of converting image data for display into image data for printing according to a first embodiment of the present invention. This processing is executed by the CPU 1 shown in FIG. 9.

(Luminance-to-density conversion processing)

In step S301, original-image data (Rin, Gin and Bin) are input from the computer 7. In step S302, luminance-to-density conversion processing is performed for the R, G and B image data in order to convert these data into C, M and Y image data (Cin, Min and Yin). This luminance-to-density conversion processing includes luminance-to-density conversion represented by the following expression (1) as well as correction in accordance with characteristics of a monitor, such as color matching for adjusting hue between a displayed image and a printed image:

$$C = A \times \log(-Rin)$$
$$M = A \times \log(-Gin)$$
$$Y = A \times \log(-Bin), \qquad (1)$$

where A is a constant.

(Achromatic-color extraction processing)

Next, in step S303, an achromatic-color component K1 is extracted from the C, M and Y image data, and chromatic-color components C1, M1 and Y1 are generated according to the following expression (2). One of the chromatic-color components C1, M1 and Y1 after extracting the achromatic color equals zero.

$$K1 = \min(\text{Cin}, \text{Min and Yin})$$

$$C1 = \text{Cin} - K1$$

$$M1 = \text{Min} - K1$$

$$Y1 = \text{Yin} - K1. \quad (2)$$

(Color correction procesing)

Next, in step S304, the following color correction is performed for the chromatic-color components C1, M1 and Y1, and chromatic-color components C2, M2 and Y2 indicated by real numbers are generated.

Figure 4:
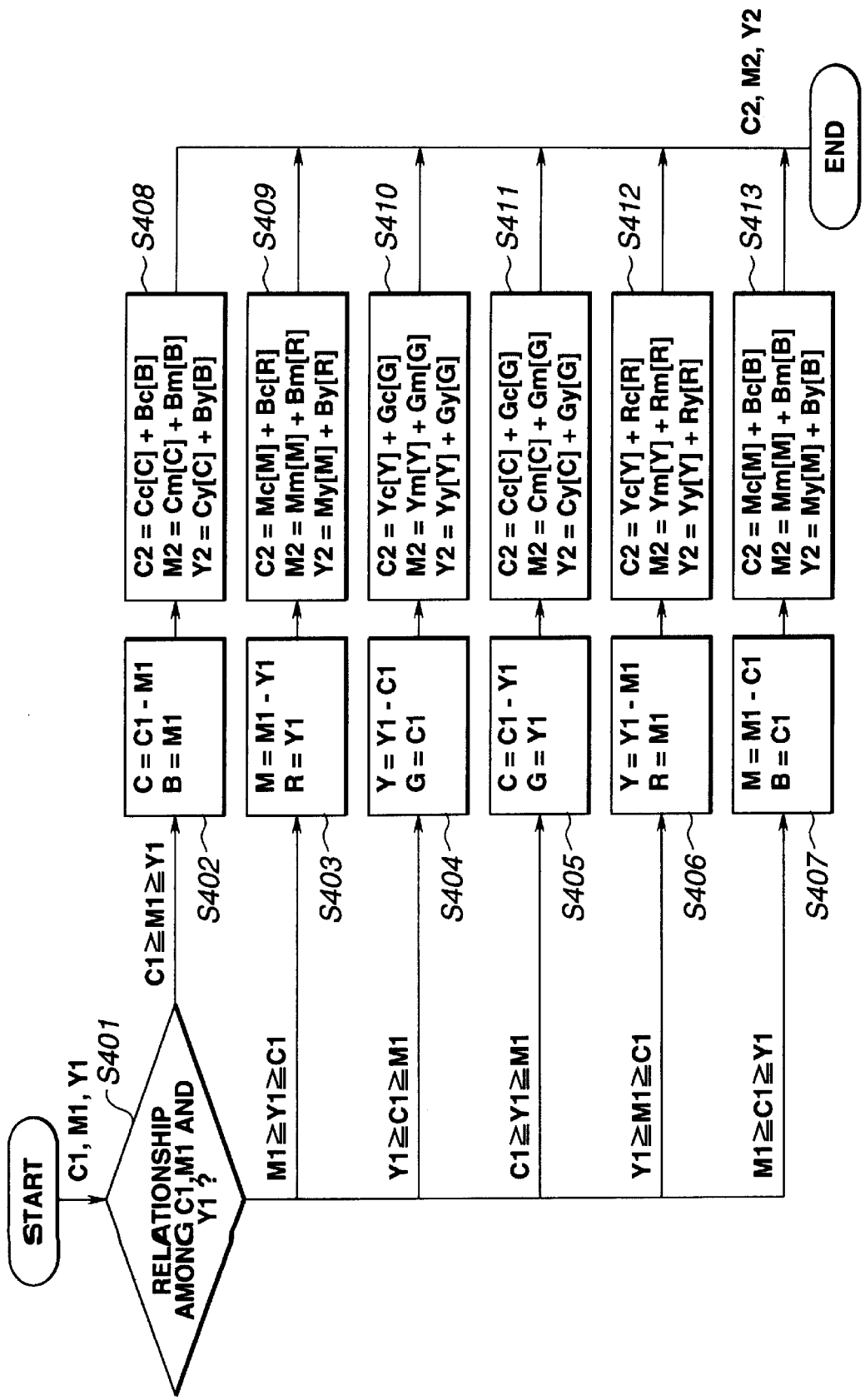
FIG. 4 is a flowchart illustrating a detailed example of color correction processing shown in FIG. 3.

FIG. 4 is a flowchart illustrating the color correction processing performed in step S304. In step S401, the values of C1, M1 and Y1 are compared with one another, and the processing branches in accordance with the order of the magnitudes of C1, M1 and Y1. For example, when $C1 \geq M1 \geq Y1$, in step S402, C1−M1=C is made to be a primary color, and M1=B is made to be a secondary color. In step S408, chromatic-color components C2, M2 and Y2 after color correction are generated according to the following expression (3):

$$C2 = C_c[C] + B_c[B]$$

$$M2 = C_m[C] + B_m[B]$$

$$Y2 = C_y[C] + B_y[B]. \quad (3)$$

$B_c[B]$, $B_m[B]$ and $B_y[B]$ represent signal values of C, M and Y necessary for representing the blue density of the secondary color B. If ideal blue is obtained when performing recording by superposing cyan ink and magenta ink of an equal amount, $B_c[B]=B$, $B_m[B]=B$, and $B_y[B]=0$. However, since an actual ink color does not completely coincide with an ideal color, ideal blue cannot be obtained by performing recording by superposing cyan ink and magenta ink of an equal amount. The same situation holds when obtaining red or green.

As shown in FIG. 4, primary colors and secondary colors are obtained (steps S403–S407) for cases other than $C1 \geq M1 \geq Y1$, and chromatic-color components C2, M2 and Y2 after color correction are generated (steps S409–S413).

Next, a description will be provided, for example, of a method of setting $C_c[C]$ in calculation performed in steps S408–S413. Results of calculation for unnecessary comonents, such as calculation $C_y[C]$ corresponding to a yellow component and calculation $C_m[C]$ corresponding to a magenta component in cyan, calculation $B_m[B]$ for a yellow component in blue, and the like, are set so as to provide corresponding negative values. In the first embodiment, negative parameters are simply determined in the following manner.

First, a color patch is formed and the following parameters are measured:

CinC, CinM, CinY, CinR, CinG, CinB

MinC, MinM, MinY, MinR, MinG, MinB

YinC, YinM, YinY, YinR, YinG, YinB, where XinZ represents the density of a color component X in a color patch formed so that an arbitrary color Z has the maximum density. If two other colors are made to be unnecessary components for each of the primary colors C, M and Y, negative parameters are represented by:

$$C_m[C] = -C \times \text{MinC}/\text{MinM}, \quad C_y[C] = -C \times \text{YinC}/\text{YinY}$$

$$M_c[M] = -M \times \text{CinM}/\text{CinC}, \quad M_y[M] = -M \times \text{YinM}/\text{YinY}$$

$$Y_c[Y] = -Y \times \text{CinY}/\text{CinC}, \quad Y_m[Y] = -Y \times \text{MinY}/\text{MinM}. \quad (4)$$

If one other color is made to be an unnecessary component for each of the second colors R, G and B, negative parameters are represented by:

$$R_c[R] = -R \times \text{CinR}/\text{CinC}$$

$$G_m[G] = -G \times \text{MinG}/\text{MinM}$$

$$B_y[B] = -B \times \text{YinB}/\text{YinY}. \quad (5)$$

The parameters thus obtained are recorded in a table, and the calculation of steps S408–S413 is performed referring to this table.

Actually, the relationship between the amount of supplied ink and the density indicated by ink recorded on a recording sheet is not always linear. In consideration of the nonlinearity, a table may be prepared in steps with which nonlinear characteristics can be reproduced, not only for the maximum density but also for the range of all data (for example, 0–255). If color correction processing is performed by referring to such a table, more desirable results of correction can, of course, be obtained.

(Density correction processing)

The C, M and Y image data subjected to color correction in step S304 (C2, M2 and Y2) and the black data K1 are independently subjected to density correction in step S305, and C, M, Y and K image data (C3, M3, Y3 and K2) are obtained. In general, the density correction is performed by a printer driver or the like for each of the colors based on density and contrast values arbitrarily set by the user.

Density correction processing is performed before black-generation processing, because, as will be described in detail later, C, M, Y and K inks are used in order to reproduce black. That is, when performing density correction after black-generation processing, if, for example, only the C component is emphasized, a C component generated by black-generation processing is also emphasized, thereby degrading gray balance. On the other hand, if density correction for black is performed after black-generation processing, only the K component is emphasized, and C, M and Y components generated by black-generation processing are not corrected. (Black-generation processing)

The C, M, Y and K image data subjected to density correction (C3, M3, Y3 and K2) are subjected to black-generation processing in step S306 (FIG. 3.)

Figure 5:
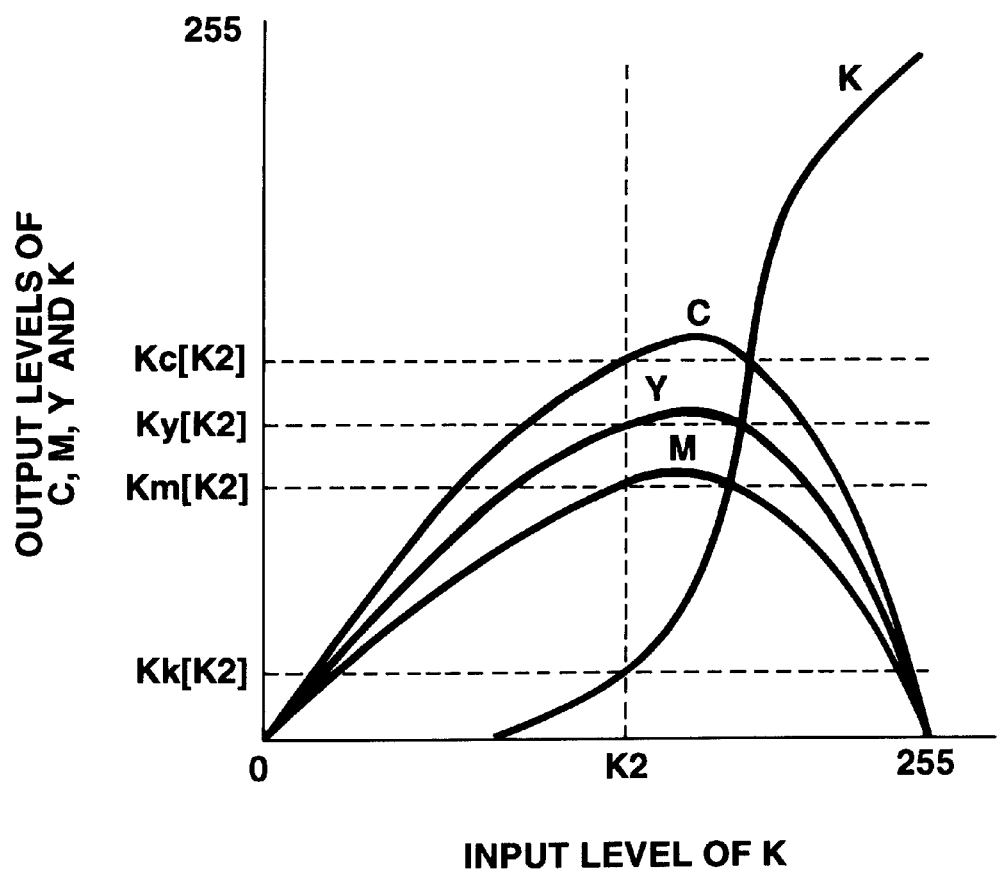
FIG. 5 is a graph illustrating black-generation processing shown in FIG. 3.

In the black-generation processing in the first embodiment, black is represented using inks of four colors, C, M, Y and K, based in input black data K2. More specifically, as shown in FIG. 5 as an example, when the input level of K (the value of K2) is low, black is represented by three colors, C, M and Y. In an intermediate density portion, black is represented by inks of four colors, C, M, Y and K, and in a highest density region, black is represented only by K ink. The reason is as follows.

In general, in ink-jet printers, it is more difficult to modulate the density of one dot than in printers of other types. Accordingly, when representing low-density black, black dots are sparsely recorded on a recording sheet, thereby providing a grainy look.

In order to overcome such a problem, the phenomenon that, when reproducing black by superposing C, M and Y inks, the density of black is lower than when reproducing black using K ink. That is, by reproducing low-density black by superposing C, M and Y inks, the number of black dots formed by the C, M and Y inks becomes larger than when reproducing black using K ink, thereby improving the grainy look. However, there is a limitation in the amount of ink which can be received by a recording sheet. Hence, if high-density black is recorded by superposing C, M and Y inks, the amount of ink becomes superfluous, thereby causing degradation in the picture quality. If low-density black is formed by superposing C, M and Y inks, and high-density black is formed using K ink, it is possible to improve the grainy look, and to maintain high picture quality over the entire density range.

That is, in step S306, the following calculation is performed using respective output levels $K_c[K2]$, $K_m[K2]$, $K_y[K2]$ and $K_k[K2]$ of C, M, Y and K for forming black for the input level of K (the value of K2), and C4, M4, Y4 and K3 indicated by integers are output. If the result of calcualtion is equal to or less than zero, the value is clipped to zero.

$$C4=C3+K_c[K2]$$
$$M4=M3+K_m[K2]$$
$$Y4=Y3+K_y[K2$$
$$K3=K_k[K2]. \qquad (6)$$

(Output correction processing)

The C, M, Y and K image data subjected to black-generation processing (C4, M4, Y4 and K3) are subjected to predetermined output correction processing based on characteristics of ink, and the like in step S307, and C, M, Y and K image data (Cout, Mout, Yout and Kout) are thereby obtained and are transmitted to the printer.

Although detailed processing at the printer side is not described, in binary printers, such as ink-jet printers or the like, ink-jet nozzles constituting the printer head are driven based on binary color image data obtained by performing pseudo-halftone processing according to an error diffusion method or a dither method for input image data, to form a color image on a recording sheet.

As described above, in the image processing of the first embodiment, a signal value corresponding to an unnecessary component included in ink is subtracted in color correction processing, and an amount corresponding to the subtracted signal value is added in black-generation processing as a chromatic-color component for forming black. Accordingly, influence by the unnecessary component included in the ink is removed according to the color correction processing of subtracting the signal value corresponding to the unnecessary component included in the ink. Hence, it is possible to prevent a decrease in saturation in chromatic-color components as well as a decrease in saturation in the entire image. Furthermore, according to black-generation processing of representing black using inks of four colors C, M, Y and K, it is possible to generate black including an unnecessary component included in ink, and to improve the grainy look in low-density black compared with the case of representing black only using K ink. In addition, since color correction processing is performed before black-generation processing, chromatic-color components are not generated for an achromatic-color component, so that gray balance can be exactly maintained.

As described above, according to image processing of the first embodiment, it is possible to prevent a decrease in saturation in the entire image while maintaining reproducibility for an achromatic color (exact gray balance).

Although in the foregoing color correction processing, the method of separating original image data into image data of six colors C, M, Y, R, G and B and referring to a table has been described, the present invention is not limited to such an approach, and any other color correction method, such as a masking method, a mapping method or the like, may also be used.

Second Embodiment

A description will now be provided of an image processing apparatus according to a second embodiment of the present invention. In the second embodiment, substantially the same components as those in the first embodiment are indicated by the same reference numerals, and a further description thereof will be omitted.

In image processing according to the second embodiment, gradation in chromatic-color components is maintained in the method of separating original image data into image data of six colors C, M, Y, R, G and B.

Figure 6:
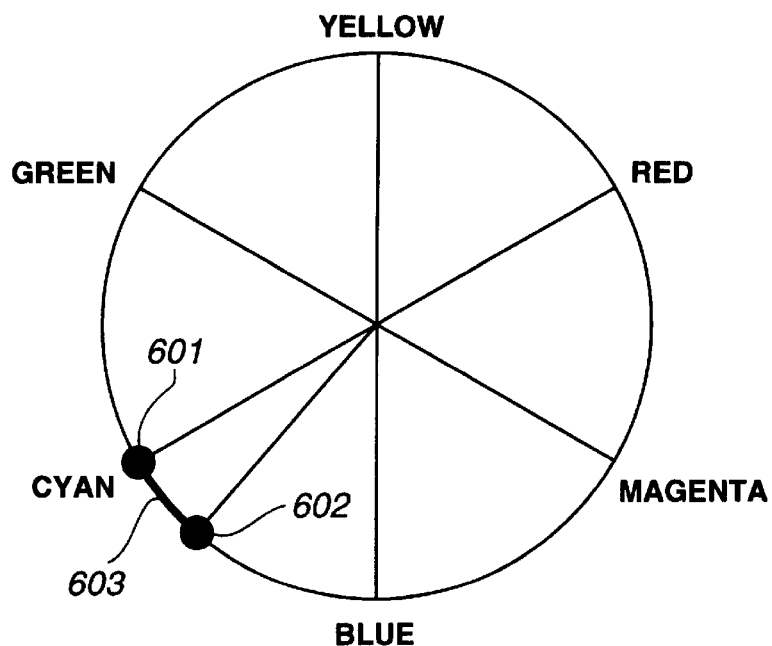
FIG. 6 illustrates image processing according to a second embodiment of the present invention.
Figure 6:
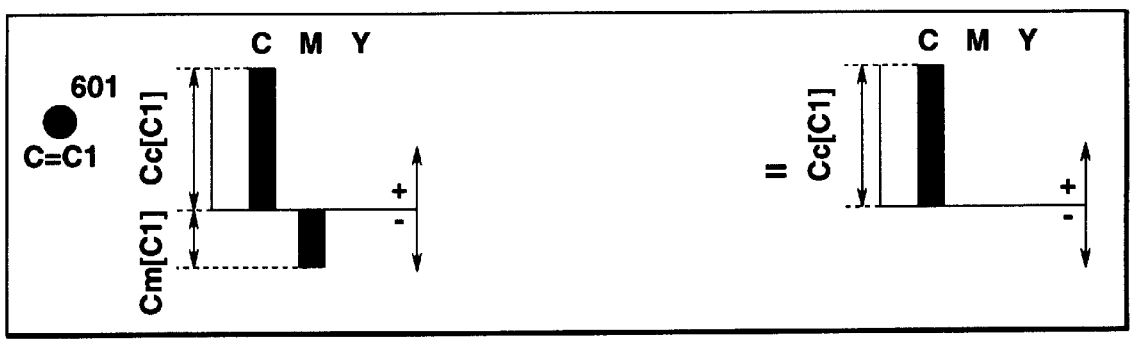
Figure 6:
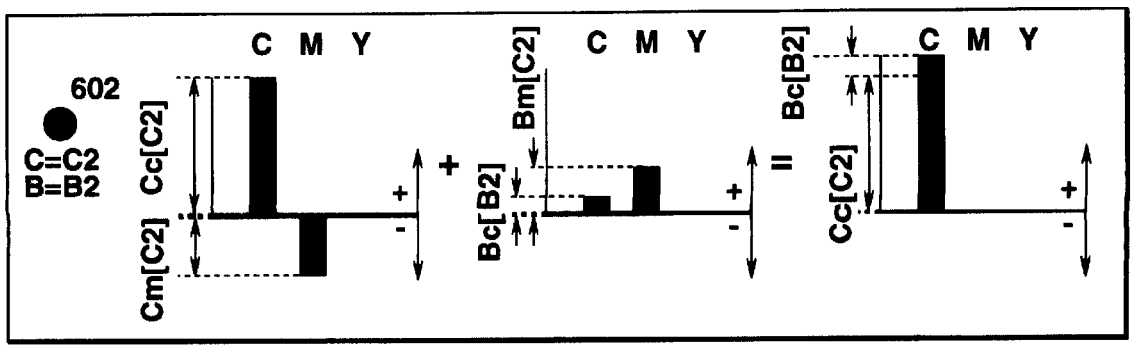

In the image processing in the first embodiment, although saturation in chromatic colors and reproducibility for an achromatic color are guaranteed, gradation in chromatic colors is, in some cases, degraded, particularly when the amount of an unnecessary component included in ink is large because of the following reasons. That is, as shown in FIG. 6, if, for example, the amount of a magenta component included in C ink is large, the negative value of $C_m[C]$ becomes large. Hence, in a region 603 between ideal cyan 601 and the color of C ink 602 where chromatic-color components are dominant, a signal component corresponding to M ink is not generated as shown in FIG. 6 and in the following expression. Accordingly, a color in the region 603 where chromatic-color components are dominant is represented only by C ink, thereby degrading gradation.

$$M=C_m[C3]+B_m[B3]\leq 0 \qquad (7).$$

In expression (7), C3 and B3 are a primary color and a secondary color, respectively, at an arbitrary point in the region 603. If a primary color of the ideal cyan 601 is represented by C1, and a primary color and a secondary color of the C-ink color 602 are represented by C2 and B2, respectively, the following relationship holds:

$$C1\leq C3\leq C2, \ 0\leq B3\leq B2 \qquad (8).$$

In the image processing of the second embodiment, negative parameters corresponding to unnecessary components are not used for primary colors C, M and Y, and negative parameters corresponding to unnecessary components are used only for secondary colors R, G and B. As a result, a signal component corresponding to M ink is generated even in the region 603 where chromatic-color components are dominant, thereby maintaining gradation. Since an unnecessary component of a secondary color always forms an achromatic-color component, a negative parameter for the unnecessary component of the secondary color mitigates a decrease in saturation in chromatic-color components.

As described above, by using only negative parameters corresponding to unnecessary components of secondary colors in the color correction processing in the first embodiment, it is possible to prevent a decrease in saturation of chromatic-color components while maintaining gradation in chromatic-color components, and to provide an image having an excellent picture quality.

Third Embodiment

A description will now be provided of an image processing apparatus according to a third embodiment of the present invention. In the third embodiment, substantially the same components as those in the first embodiment are indicated by the same reference numerals, and a further description thereof will be omitted.

In the third embodiment, particularly, gradation in a color which has both of secondary-color components and an achromatic-color component is maintained.

Figure 7:
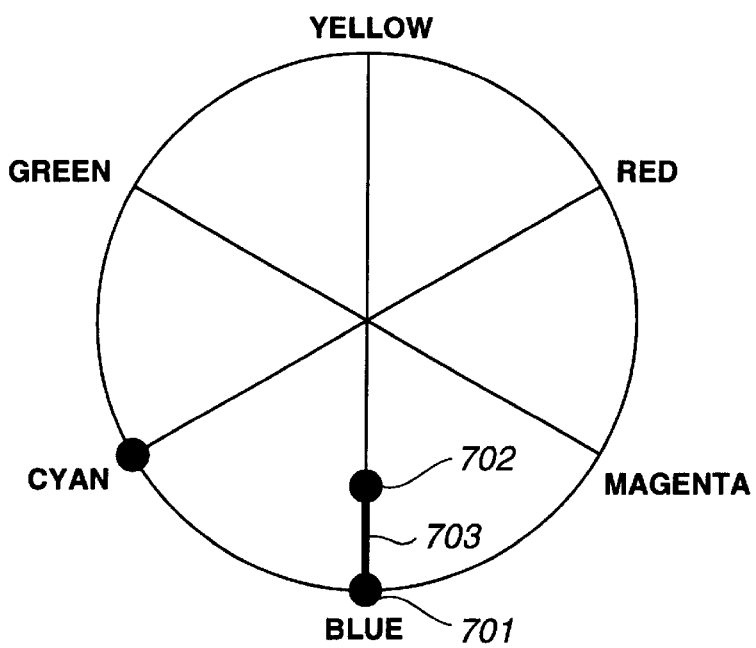
FIG. 7 illustrates image processing according to a third embodiment of the present invention.
Figure 7:
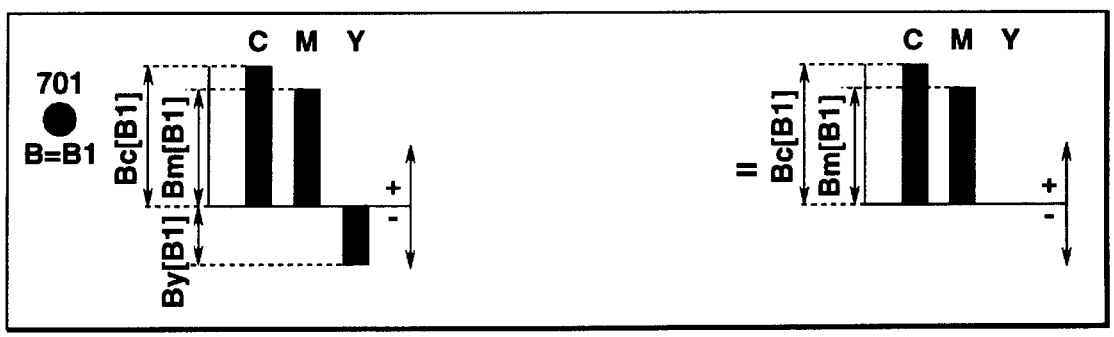
Figure 7:
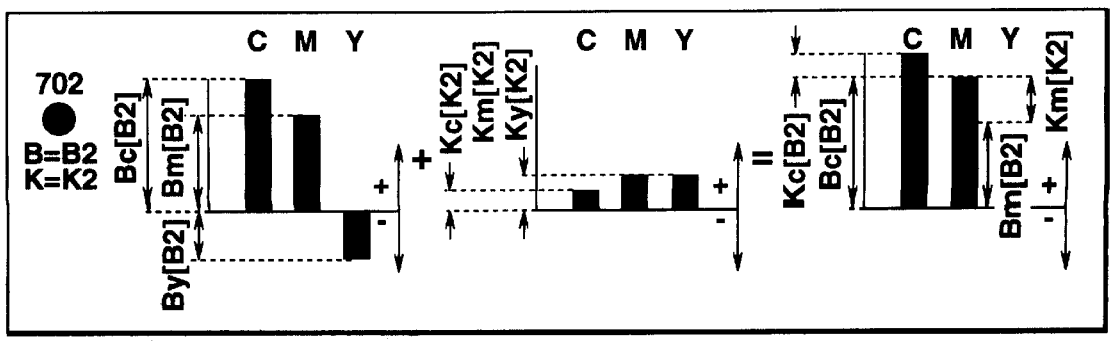

In the image processing in the second embodiment, although saturation and gradation in chromatic colors and reproducibility for an achromatic color are guaranteed, gradation in lightness in a color which has both of secondary-color components and an achromatic-color component is, in some cases, degraded, particularly when the amount of an unnecessary component included in ink is large because of the following reasons. That is, as shown in FIG. 7, if, for example, when forming blue, the amount of an unnecessary component of yellow is large, the negative value of $B_y[B]$ becomes large. Hence, in a region 703 between ideal blue 701 and blue including an unnecessary component 702 where secondary-color components and a certain amount of achromatic-color component are present, a signal component corresponding to Y ink is not generated as shown in FIG. 7 and in the following expression. Accordingly, a color in the region 703 where secondary-color components and a certain amount of achromatic-color component are present is represented by C and M inks, thereby degrading gradation in lightness.

$$Y = B_y[B3] + K_y[K3] \leq 0 \quad (8).$$

In expression (8), B3 and K3 are a primary color and K input data, respectively, in the above-described black-generation processing at an arbitrary point in the region 703. If the secondary color of the ideal blue 701 is represented by B1, and the secondary color and K input data of blue including an unnecessary component 702 are represented by B2 and K2, respectively, the following relationship holds:

$$B1 \leq B3 \leq B2, \ 0 \leq K3 \leq K2 \quad (9).$$

Figure 8A:
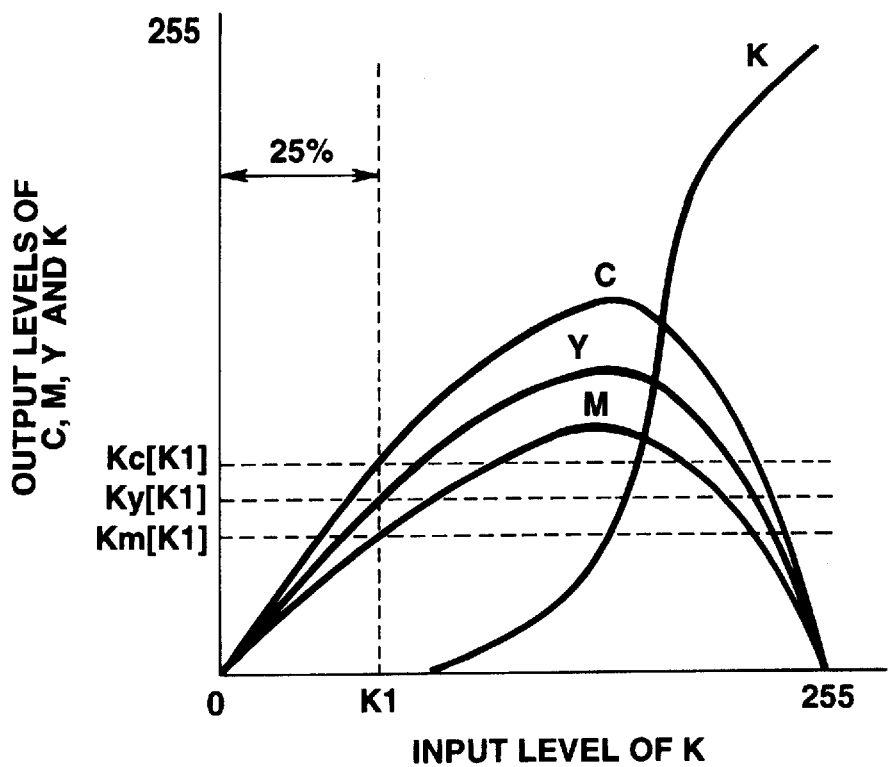
FIGS. 8A and 8B are graphs illustrating image processing according to the third embodiment.

In the image processing of the third embodiment, a minimum value is provided for each of negative parameters $R_c[R]$, $G_m[G]$ and $B_y[B]$ corresponding to unnecessary components of secondary colors. For example, when intending to maintain gradation in lightness in a region where an achromatic-color component is 100–25%, as shown in FIG. 8A, values obtained by multiplying C, M and Y components necessary for generating a K value having an achromatic-color component of 25% (K1 shown in FIG. 8A) by −1 ($K_c[K1]$, $K_m[K1]$ and $K_y[K1]$ shown in FIG. 8A) are made to be respective minimum values.

Figure 8B:
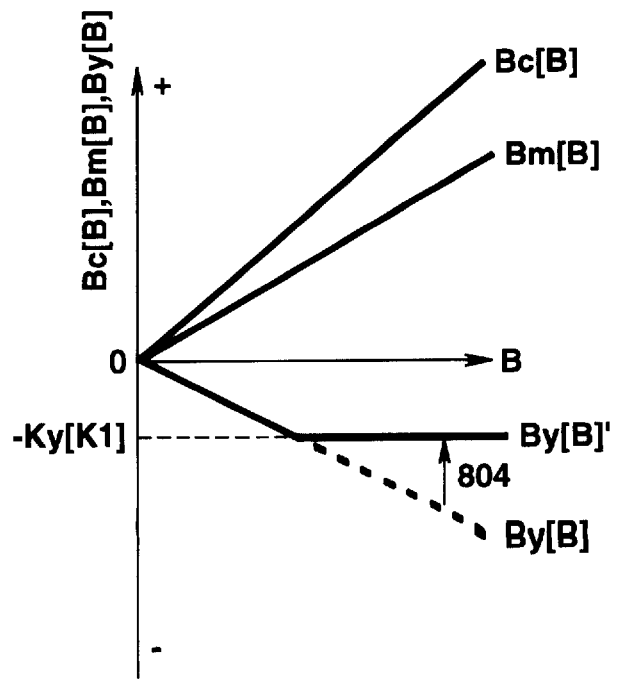

Illustrating a case of blue, the value of a negative parameter $B_y[B]$ for yellow, serving as an unnecessary component of blue, is clipped with a value −1 multiple of the amount of generation of Y necessary for generating an achromatic-color component of 25% $K_y[K1]$, i.e., $-K_y[K1]$ (refer to an arrow 804 shown in FIG. 8B). Thus, in the region where an achromatic-color component is 100–25% in secondary-color blue, a signal component corresponding to Y ink is always generated. Hence, gradation in lightness in this region is maintained.

As described above, by providing minimum values for negative parameters corresponding to unnecessary components of secondary colors, it is possible to maintain gradation in chromatic-color components, to prevent a decrease in saturation in chromatic-color components, to maintain gradation in lightness in a color having both of secondary-color components and an achromatic-color component, and to obtain an image having excellent picture quality.

Other Embodiments

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, be also achieved by supplying a system or an apparatus with a storage medium storing program codes of software for realizing the functions of the above-described embodiments, and reading and executing the program codes stored in the storage medium by a computer (or a CPU or an MPU (microprocessor unit)) of the system or the apparatus. In such a case, the program codes themselves read from the storage medium realize the functions of the above-described embodiments, so that the storage medium storing the program codes constitutes the present invention. For example, a floppy disk, a hard disk, an optical disk, a magnetooptical disk, a CD(compact disk)-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

When applying the present invention to the storage medium, programs codes corresponding to the above-described flowcharts are stored in the storage medium. More specifically, respective modules illustrated in a memory map shown in FIG. 10A or 10B are stored in the storage medium. That is, program codes of at least "input", "achromatic-color-component extraction", "color correction" and "black-generation" modules, or program codes of at least "chromatic-color-component/achromatic-color-component extraction", "color correction" and "ink-signal generation" modules, or program codes of at least "chromatic-color-component/achromatic-color-component extraction", "color correction", "color adjustment" and "color correction" modules may be stored in the storage medium.

The individual components designated by blocks in the drawings are all well-known in the image processing method and apparatus arts and their specific construction and operation are not critical to the operation or the best mode for carrying out the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting an image signal including a plurality of color-component signals;

extraction means for extracting an achromatic-color component from the input image signal and for subtracting the achromatic-color component from the plurality of color-component signals;

color correction means for performing color correction for a plurality of color-component signals output from said extraction means, and for outputting a plurality of color-component signals subjected to color correction indicated by real numbers; and generation means for generating an achromatic-color-component signal based on the achromatic-color component extracted by said extraction means, and for generating a plurality component by adding the achromatic-color component to the plurality of color-component signals subjected to the color correction by said color correction means, the plurality of color-component signals being indicated by real numbers, wherein when the generation means adds the plurality of color-component signals subjected to the color correction by said color correction means, the plurality of color-component signals being indicated by real numbers, to the achromatic-color component, and when the plurality of color component signals indicates zero or less, the generation means considers the signals as being zero.

2. An image processing apparatus according to claim 1, wherein said color correction means performs the color correction by representing color components provided by color materials for recording an image and other color components included in the color materials with positive parameters and negative parameters, respectively.

3. An image processing apparatus according to claim 1, wherein said generation means generates the achromatic-color component by the plurality of color-component signals by setting the achromatic-color-component signal to zero, when a level of the extracted achromatic-color component is small.

4. An image processing apparatus according to claim 1, further comprising density correction means for performing desired density correction for the achromatic-color component extracted by said extraction means and for the plurality of color-component signals subjected to the color correction by said color correction means, and for inputting resultant signals to said generation means.

5. An image processing apparatus comprising:
input means for inputting an image signal including a plurality of color-component signals;
extraction means for extracting an achromatic-color component from the input image signal and for subtracting the achromatic-color component from the plurality of color-component signals;
color correction means for performing color correction for the plurality of color-component signals output from said extraction means, and for outputting a plurality of color-component signals subjected to color correction indicated by real numbers; and
generation means for generating an achromatic-color-component signal based on the achromatic-color component extracted by said extraction means, and for adding the achromatic-color component to the plurality of color-component signals subjected to the color correction by said color correction means,
wherein said color correction means calculates the plurality of color-component signals after the color correction based on primary colors and secondary colors set from the relationship among levels of the plurality of color-component signals.

6. An image processing apparatus according to claim 5, wherein said color correction means represents only color components corresponding to the secondary colors from among the other color components with negative parameters.

7. An image processing apparatus according to claim 6, wherein said color correction means limits signal values calcuated by the negative parameters of the color components corresponding to the secondary colors.

8. An image processing apparatus according to claim 5, wherein the primary colors are provided by color materials for recording an image, and wherein the secondary colors are provided by superposing the color materials.

9. An image processing method comprising:
an input step of inputting an image signal including a plurality of color-component signals;
an extraction step of extracting an achromatic-color component from the input image signal, and subtracting the achromatic-color component from the plurality of color-component signals;
a color correction step of performing color correction a plurality of color-component signals obtained in said extraction step, and outputting a plurality of color-component signals subjected to color correction indicated by real numbers; and
a generation step of generating an achromatic-color-component signal based on the achromatic-color-component signal based on the achromatic-color component extracted in said extraction step and generating a plurality component by adding the achromatic-color component to the plurality of color-component signals subjected to the color correction in said color correction step, the plurality of color-component signals being indicated by real numbers,
wherein when the generation means adds the plurality of color-component signals subjected to the color correction by said color correction means, the plurality of color-component signals being indicated by real numbers, to the achromatic-color component, and when the plurality of color-component signals indicates zero or less, the generation means considers the signals as being zero.

10. An image processing method comprising:
an input step of inputting an image signal including a plurality of color-component signals;
an extraction step of extracting an achromatic-color component from the input image signal, and subtracting the achromatic-color component from the plurality of color-component signals;
a color correction step of performing color correction for the plurality of color-component signals obtained in said extraction step, and outputting a plurality of color-component signals subjected to color correction indicated by real numbers;
a generation step of generating an achromatic-color-component signal based on the achromatic-color component extracted in said extraction step and adding the achromatic-color component to the plurality of color-component signals subjected to the color correction in said color correction step; and
a density correction step of performing desired density correction for the achromatic-color component extracted in said extraction step and for the plurality of color-component signals subjected to the color correction in said color correction step, and inputting resultant signals to said generation step.

11. A memory which can be read by a computer and which stores program codes for image processing, said memory comprising:
  a code of an input step of inputting an image signal including a,plurality of color-component signals;
  a code of an extraction step of extracting an achromatic-color component from the input image signal, and subtracting the achromatic-color component from the plurality of color-component signals;
  a code of a color correction step of performing color correction for a plurality of color-component signals obtained in the extraction step, and outputting a plurality of color-component signals subjected to color correction indicated by real numbers; and
  a code of a generation step of generating an achromatic-color-component signal based on the achromatic-color component extracted in the extraction step, and generating a plurality component by adding the achromatic-color component to the plurality of color-component signals subjected to the color correction in the color correction step, the plurality of color-component signals being indicated by real numbers,
  wherein when said code of said generation step adds the plurality of color-component signals subject to the color correction by said code of said color correction step, the plurality of color-component signals being indicated by real numbers, to the achromatic-color component, and when the plurality of color-component signals indicates zero or less, said code of said generation step considers the signals as being zero.

12. An image processing apparatus comprising:
  input means for inputting an image signal including a plurality of color-component signals;
  extraction means for extracting an achromatic-color component from the input image signal and for subtracting the achromatic-color component from the plurality of color-component signals;
  color correction means for performing color correction for a plurality of color-component signals output from said extraction means, and for outputting a plurality of color-component signals including an unnecessary component value;
  generating means for generating an achromatic-color-component signal based on the achromatic-color component extracted by said extraction means; and
  composing means for composing a plurality of color-component signals including the unnecessary component value and the achromatic-component signals and for generating output black-component signals and a plurality of output color-component signals,
  wherein as a result of the composition, if the plurality of output color-component signals indicate zero or less, said composing means considers the signals as being zero.

13. An image processing method comprising;
  an input step of inputting an image signal including a plurality of color-component signals;
  an extraction step of extracting an achromatic-color component from the input image signal and for subtracting the achromatic-color component from the plurality of color-component signals;
  a color correction step of performing color correction for a plurality of color-component signals output by said extraction step, and for outputting a plurality of color-component signals including an unnecessary component value;
  a generating step of generating an achromatic-color-component signal based on the achromatic-color component extracted by said extraction step; and
  a composing step of composing a plurality of color-component signals including the unnecessary component and the achromatic-component signals and for generating output black-component signals,
  wherein as a result of the composition, if the plurality of output color-component signals indicate zero or less, said composing step considers the signals as being zero.

* * * * *

UNITED STATES PATENT AND TRADEMARK OFFICE
CERTIFICATE OF CORRECTION

PATENT NO. : 6,191,874 B1  
DATED : February 20, 2001  
INVENTOR(S) : Akitoshi Yamada et al.

Page 1 of 1

It is certified that error appears in the above-identified patent and that said Letters Patent is hereby corrected as shown below:

Column 6,  
Line 47, "(Black-generation" should read -- ¶(Black-generation --.

Column 7,  
Line 18, "calcual-" should read -- calcula- --; and  
Line 24, "[K2" should read -- [K2] --.

Column 10,  
Line 40, "programs" should read -- program --.

Column 12,  
Line 21, "correction a" should read -- correction for a --;  
Line 28, "signal based on the achromatic-color com-" should be deleted; and  
Line 29, "ponent" should be deleted.

Column 13,  
Line 5, "a,plurality" should read -- a plurality --; and  
Line 25, "subject" should read -- subjected --.

Column 14,  
Line 35, "black-component signals," should read -- black-component signals and a plurality of output color-component signals, --.

Signed and Sealed this

Twenty-eighth Day of May, 2002

Attest:

Attesting Officer

JAMES E. ROGAN  
Director of the United States Patent and Trademark Office